MODULATION OF ARC LAMP

Filed Dec. 20, 1965

INVENTORS.
CHARLES T. ROTH
JAMES A. SMITH
BY Anthony D. Cennamo
Stefan J. Klauber
ATTORNEY 3,449,630

MODULATION OF ARC LAMP

Charles T. Roth, Webster, and James A. Smith, Rochester, N.Y., assignors to Xerox Corporation, Rochester, N.Y., a corporation of New York Filed Dec. 20, 1965, Ser. No. 514,808
Int. Cl. H05b *37/02, 39/09, 41/30*
U.S. Cl. 315—172 6 Claims

ABSTRACT OF THE DISCLOSURE

The modulation to a mercury short-arc lamp emanates from a controllable constant current source which is positioned in parallel across the simmering arc lamp. The simmering arc is maintained across the lamp electrodes during quiescent periods by a coil and power supply in coupling relation to the lamp. Consequently, the cutting in and out of the constant current source achieves a rapid virtually square pulse modulation of the arc lamp which emits a light output that is essentially a function of the current through the arc.

Figure 1:
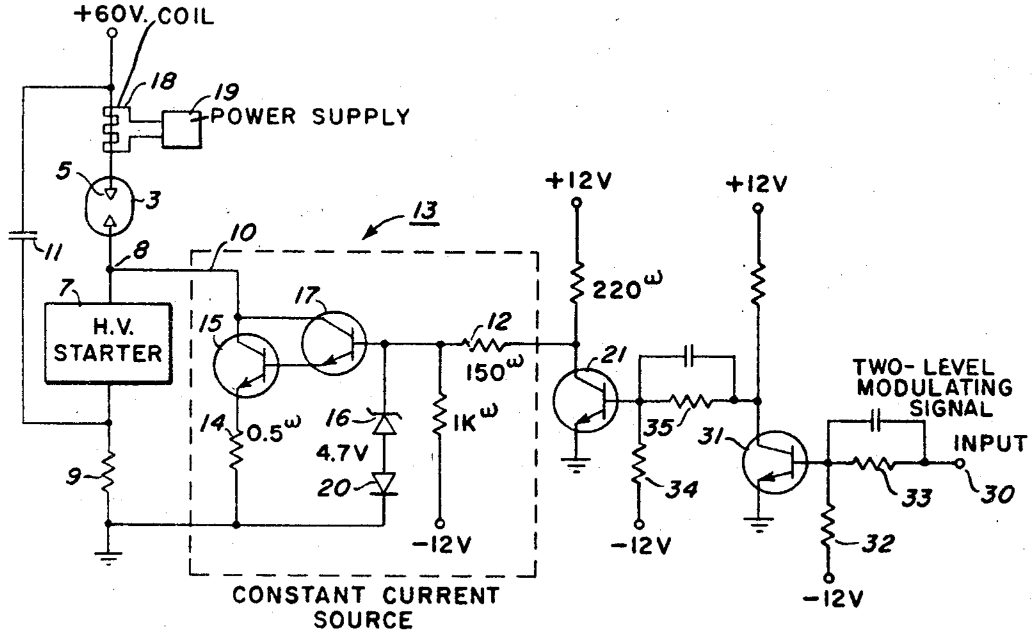

This invention relates generally to modulation of light sources and more specifically to two-level modulation of arc lamps.

In the copending application of Stephen E. Townsend bearing Ser. No. 329,640, filed on Dec. 11, 1963, entitled Facsimile Communication System, and assigned to the same assignee as the present application, there is disclosed a system for deriving and transmitting an electrical signal ideally suited for creating a facsimile of the original document of which the signal is representative. For purposes of present discussion, the significant feature of this signal lies in its discrete two-level structure. Ignoring, therefore, for present purposes the manner in which such a signal may be established, the important point is that at the receiving station where the document is to be reconstructed, the signal varies only between a first level representing black and a second level representing white.

Reconstruction of the original document is brought about by modulating with the two-level signal a suitable light source, as the source scans a recording surface in synchronism with scanning of the original document. In the simplest case the modulation action is internal—i.e. at the light source itself—as opposed to modulation by exterior means such as light valves, etc. While Townsend does not so delimit the system it has in fact been common practice in environments of this type to utilize a cathode ray tube at the receiving end of the system, the choice of this element being dictated primarily by the extreme ease with which its light output may be internally controlled.

In this connection, it would be profitable to consider the requirements placed upon a light source utilized in this type of environment, that is, in a setting wherein the light source is made to scan rapidly across a recording surface as its intensity is internally modulated between two levels indicative of the presence or absence of information. Obviously, at a bare minimum there must be a capability for rapidly shifting between the two light levels. Furthermore as the speed of scanning and/or detail in the material scanned increases, the demand placed upon the frequency of transition capability becomes heavier and heavier. It should also be clear that in order to achieve sharp definition on the recording surface it is extremely desirable that the transitions be distinct and direct. In electronic terms, the transition pulse should be virually square. For the same reason the light intensity at either of the two levels should desirably be as steady as possible. Finally, it will be more than obvious that the rapidity with which a facsimile record may be created on the recording surface will in the final analysis be limited by the inherent intensity of the light source itself, for without sufficient activating energy a record cannot be established regardless of the degree to which the several other criteria are met by a particular source.

It will probably be evident to those skilled in the art that in most respects the cathode ray tube adequately meets the criteria cited for a suitable light source for the receiving end of a two-level facsimile transmission system. In one important respect, however, the CRT is less than satisfactory. We refer here to the relatively low light output available at the tube face. Depending upon the choice of recording medium this factor can act to varying degrees as a severe limiting factor to the use of such a source in high speed reconstruction of documents. Thus it is that much effort has been expended in attempting to find a light source that like the CRT meets all the criteria established above, but in addition fulfills the requirement of high inherent intensity.

In itself the need for a high intensity light source can be met in a number of well-known ways. One of the best high intensity sources for many applications has been the arc lamp. While it was not unknown to "modulate" such a lamp for various purposes, yet no techniques have been established in the past whereby the stringent modulation requirements of the present environment could be met. In the case for example of the low pressure arc lamps—that is to say the well-known flash lamps—that have been utilized extensively in recent years, cold cathodes are used which are usually activated by the capacitive discharge. In addition to the fact that such a discharge does not normally result in the square light pulse demanded by the present environment, there is the additional consequence of the cold cathode that an unacceptable upper limit exists to the frequency of modulation—if the discharge process can in fact be called "modulation"—of approximately 1,000 cycles per second.

Better hope was held out for the so-called short arc lamps. The latter essentially comprise a two-electrode structure separated by a gap of a few thousandths of an inch, the structure being encased in a vapor or inert gas at a pressure of some ten to twenty atmospheres. In addition to the fact that these devices are more nearly point sources of light than the other types of arcs, there was the factor that in their normal operations such lamps can be increased and decreased in intensity without completely extinguishing the arc by maintaining a low level so-called "simmering" current. However, no technique was known for producing sufficiently sharp turn-on characteristics so that sufficiently square pulses of the high frequency required could be produced.

In accordance with the foregoing, it is one object of the present invention to provide an extremely high intensity light source which may be modulated between two levels with great rapidity.

It is another object of the present invention to provide a technique whereby a short arc lamp may be driven between two light output levels with a rapidity exceeding that which the normal turn-on and turn-off time of the lamp would seem to indicate is feasible.

It is a further object of the present invention to provide circuitry whereby a short arc lamp may be driven from a first to a second intensity level in an extremely short time duration, and maintained at the second intensity level with substantially no variation for a desired period.

It is an additional object of the present invention to provide a technique whereby the current input to an arc lamp is so controlled that one may produce virtually square light pulses from the lamp with a frequency exceeding that previously known.

These and other objects are achieved in the present invention by the combination of a short arc lamp—which in the preferred embodiment constitutes a mercury arc—with a controllable constant current input source positioned in parallel with the simmering arc. The elements comprising the constant current source are so disposed in a circuit that the constant current value may be obtained from a cut-off level in an extremely short time. The time from cut-off to the constant current level is in fact sufficiently short as to produce a virtually square current pulse. The light output of the short arc, which is essentially a function of the current through the arc, follows this current pulse and is accordingly virtually square in nature. The rapid cutting in and out of the constant current source thereby achieves a rapid, virtually square pulse modulation of the short arc lamp.

Figure 1A:
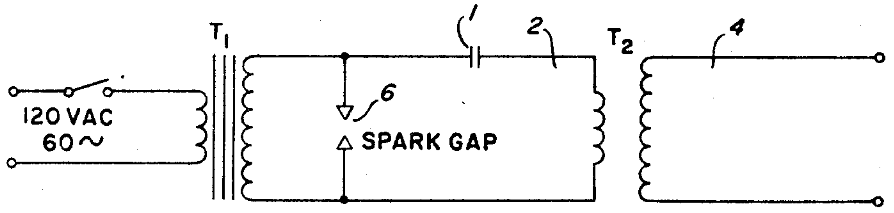

The manner in which the present invention operates to achieve the results previously indicated, and the manner in which the invention thereby satisfies the objects recited in the foregoing paragraphs, may now best be understood by a reading of the following detailed specification, and by a simultaneous examination of the drawings appended hereto, in which:

FIG. 1 is a schematic diagram illustrating the manner in which the various electronic components are arranged in order to achieve the desired modulation of the short arc lamp; and FIG. 1A is a schematic diagram of a high voltage starting circuit suitable for use in the system depicted in FIG. 1.

In the descriptions that follow, certain parameters such as currents, voltages, capacitances, resistances, etc. may be assigned specific values. It should be understood that the designation of parameters in this manner is intended merely to provide a concrete illustration of the present invention. The values given should accordingly in no way be construed as a limitation upon the scope of the present invention.

In FIG. 1 a short arc lamp of the type utilized in the present invention is depicted at 3. The lamp itself is a commercially available item and in the preferred embodiment of the invention may specifically constitute a mercury arc lamp of the type available under the designation "Mercury Short Arc Lamp" from PEK Lab. Inc., at 825 East Evelyn Ave., Sunnyvale, Calif. The Xenon short arc lamps—which are also available from the same supplier—may also be utilized in the present environment. However, it has been found as an empirically demonstrable fact that the mercury lamps exhibit greater arc stability in the present invention.

A DC power supply not shown in the FIG. 1 supplies a potential (illustratively shown as +60 volts) at terminal 5—one input of the short arc lamp. The alternate side of the power supply is grounded. A high voltage starter unit is shown at 7 in apparent series connection with the arc lamp. The structure of this starter unit—while conventional—is illustrated for purposes of clarification in FIG. 1A. In the sense of this diagram only the secondary coil 4 of transformer T2 is actually in series with the arc lamp 3. Transformer T1 in the same figure is typically a 2 kv. power transformer with its secondary in parallel with an adjustable spark gap 6. The capacitor 1 and the primary of transformer T2 form an RF oscillating circuit with the spark gap. The secondary of T2 steps up the voltage to about 20 kv. and also has a low DC resistance so that copper losses are negligible when DC lamp current starts to flow. Capacitor 11 bypasses the RF starting voltage around the DC power supply so as to protect the latter.

With the transistor 15 in a cut-off condition and disconnected from the lamp, the arc lamp is activated. Thereafter a low level "simmering" current is maintained through the arc and the bias resistor 9. The value of this resistor 9 is so chosen that with the DC power level utilized a simmering current of approximately 0.5 amps. is maintained through the arc. In this connection, it may be noted that it is very difficult to maintain an arc in the unmodified PEK Lab. mercury lamp previously alluded to with such low values of current. It has in fact been found desirable to incorporate an external heater for the lamp, and this may be accomplished in the present system by wrapping nickel-chrome wire about the neck of the lamp and dissipating approximately 10% to 50% of the lamp rated power in the heated area. Such a coil is illustrated at 18 in FIG. 1. A conventional power supply for the coil is shown at 19.

The circuitry contained within the area 13 functions as a constant current source for the lamp 3 via the conductor 10 connected in parallel with the lamp bias resistor 9 at point 8. This constant current source 13 may be considered as driven by the low impedance switch constituted by transistor 21. As will shortly be seen, the constant current source 13 is turned on and off by the modulating input signal which drives the transistor switch 21.

The modulating signal is inserted at the input point 30 and as previously suggested may be illustratively considered as a two-level signal at a facsimile receiving station, indicative at a first level of black, and at a second level of white. The transistor 31 merely constitutes and inverting stage which may be necessary to obtain the proper direction of light modulation for a particular input signal. Thus for purposes of illustration the higher of the two input levels may be considered to represent white and the lower, black. Under such conditions the values of resistors 32, 33, 34, and 35 are for the specific signal levels utilized so chosen that with the lower signal level present at the input the transistor 31 is turned off and the transistor 21 is turned on. The input to the constant current source 13 is accordingly at ground; the Darlington-connected transistor combination of 15 and 17 is turned off, and no current flows in the conductor 10. The arc is during this period thus maintained at its low-intensity simmering value.

To continue our discussion we may now assume that a signal at the higher of the two input levels appears at input terminal 30. The transistor 31 is so biased that this higher level signal turns the transistor on. In inverse correspondence the transistor 21 is turned off. With transistor 21 off and with the biasing to the collector of 21 as indicated in FIG. 1 current begins to flow through the 150 ohm resistor 12 of sufficient magnitude to begin to reverse bias the Zener diode 16 in excess of its breakdown value. This Zener diode, however, maintains a precise reference voltage such as the 4.7 volts positive value indicated for FIG. 1 The Darlington-connected transistors 15 and 17 are now turned on and the conductive path presented to the arc lamp 3 through the transistors 15 and 17 is limited principally by the very low valve resistor 14. The letter is seen in the diagram to have a typical value of the order of 0.5 ohms.

The base-emitter voltage drop across each of transistors 15 and 17 is typically of the order of 0.8 of a volt with the illustrative parameters of FIG. 1. This leaves in the order of 3 volts to drop across the 0.5 ohm resistor 14 connected to the emitter of transistor 15. In order to obtain this three-volt drop across resistor 14 the current through this branch of the circuit must be approximately 6 amps. The current through the lamp 3 accordingly increases to this value, and because of two reasons reaches it extremely rapidly. The first is the presence of the almost normial resistance path through resistance 14, which is in fact so very small as to virtually bring point 8 to ground at time of the initial current surge. This low resistance causes the lamp to see approximately the full power supply voltage—which is about four time the normal lamp voltage—in turn causing the mercury vapor in the lamp to rapidly ionize, thereby effecting a very rapid rise in current through the lamp and a convenient proportional rise in light output.

The second factor is the presence of the Zener diode 16 which limits the rising voltage at the base of transistor 15 to the desired value.

Once the current level through the lamp reaches this desired constant current level, the Zener diode acts to immediately clamp the current at this value and thereafter hold it steady. If the current subsequently begins to increase, the voltage drop across resistance 14 will increase and therefore decrease the base-emitter voltages on transistors 15 and 17. Reducing these base-emitter voltages will begin to turn the transistors 15 and 17 off and so lower the current to the constant value once again.

On the other hand, it is clear that at any time when the current through the transistor 15 is less than the desired constant current value, this transistor will be in a saturated mode. Consequently, the point 8 as previously elucidated will go toward ground during such a period, until the current returns to the constant value.

When the input signal at terminal 30 subsequently returns to its lower value, the transistors 31 and 21 return to their respective off and on states. In order to assure a rapid turn-off of the Darlington-connected transistors 15 and 17, the diode 20 is positioned to permit rapid build up of a reverse biasing potential at the emitter-base junction of transistor 17.

With the electrical parameters as illustrated and described for in the FIGS. 1 and 1A, two-level light modulation at frequencies as high as 250 kilocycles has been achieved. But it should be re-emphasized at this point that the circuitry of the present invention not only introduces the capability of rapidly introducing virtually square current changes to the lamp arc, but in addition maintains the constant current level during the periods between level changes. The constancy of the light output during such periods is therefore in turn assured.

While the present invention has been illustrated in terms of specific embodiments, it will be understood that in view of the present teaching numerous deviations therefrom and variations thereupon may be readily produced by those skilled in the art. Accordingly, the present invention is to be broadly construed and limited only by the scope and spirit of the claims now appended hereto.

What is claimed is:

1. A modulatable light source comprising:

(a) a mercury short arc lamp, (b) electrical circuit means in coupling relationship with said lamp for establishing a simmering current through said lamp, (c) a constant current source responsive to a two-level input signal, said constant current source producing said constant current in response to one of said input signal levels and not producing said constant current at the other of said two input signal levels, and (d) electrical connecting means for connecting the output of said constant current source to said mercury short arc lamp whereby said constant current may be introduced into said arc lamp circuit in accordance with said input signal.

2. A light source modulatable between two constant intensity levels comprising:

(a) a short arc lamp, (b) circuit means for establishing a simmering current through said lamp, (c) a constant current source responsive to a two-level input signal, said source producing said constant current in response to one of said input signal levels and not producing said constant current in response to the other of two input signal levels, the output from said source being in parallel with the conducting path for said simmering current.

3. A light source according to claim 2 in which said constant current source comprises transistor means responsive to said two-level input signals, said transistor means entering a saturation mode in response to one of said input signal levels and a cut-off mode in response to the other of said input signal levels, said transistor means including negative feedback biasing means for limiting the current through said transistor means to the value desired for said constant current.

4. Apparatus according to claim 3 wherein said negative feedback biasing means includes a Zener diode.

5. A light source according to claim 2 in which said circuit means for establishing a simmering current through said lamp includes external electrical heater means for said lamp.

6. A light source according to claim 5 in which said lamp is a mercury short arc lamp.

References Cited

UNITED STATES PATENTS

| | | | |
|---|---|---|---|
| 2,920,239 | 1/1960 | Saeger | 315—170 |
| 2,961,579 | 11/1960 | Roney et al. | 315—170 |
| 3,087,065 | 4/1963 | Mutschler | 250—199 |
| 3,156,826 | 11/1964 | Mutschler | 250—199 |

JOHN W. HUCKERT, *Primary Examiner.*

SIMON BRODER, *Assistant Examiner.*

U.S. CL. X.R.

315—165, 170, 175, 179